United States Patent
Harada et al.

(10) Patent No.: US 7,749,455 B2
(45) Date of Patent: Jul. 6, 2010

(54) APPARATUS FOR TREATING COS FOR GAS PRODUCED BY GASIFICATION AND METHOD FOR TREATING COS

(75) Inventors: Masahiro Harada, Minato-ku (JP); Shintaro Honjo, Hiroshima (JP); Makoto Susaki, Minato-ku (JP); Kazuo Ishida, Minato-ku (JP); Hajime Nagano, Minato-ku (JP); Susumu Okino, Hiroshima (JP); Kozo Iida, Hiroshima (JP); Akira Johana, Hiroshima (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 699 days.

(21) Appl. No.: 10/522,604

(22) PCT Filed: Aug. 6, 2003

(86) PCT No.: PCT/JP03/09984

§ 371 (c)(1),
(2), (4) Date: Jan. 26, 2005

(87) PCT Pub. No.: WO2004/015035

PCT Pub. Date: Feb. 19, 2004

(65) Prior Publication Data

US 2006/0051263 A1   Mar. 9, 2006

(30) Foreign Application Priority Data

Aug. 9, 2002 (JP) .............................. 2002-233680

(51) Int. Cl.
*G05D 7/00* (2006.01)
*B01D 53/04* (2006.01)
*B01D 53/34* (2006.01)
*B01D 53/52* (2006.01)
*B01D 53/86* (2006.01)
*B01J 8/02* (2006.01)
*B01J 35/02* (2006.01)
*C01B 17/00* (2006.01)
*C01B 17/16* (2006.01)
*C01B 31/00* (2006.01)
*C10G 17/00* (2006.01)
*C10G 45/00* (2006.01)

(52) U.S. Cl. ................ 422/110; 422/211; 423/230; 423/236; 423/242.1; 423/244.01; 208/208 R

(58) Field of Classification Search ............... 422/110, 422/211, 190; 423/230, 236, 244.01, 242.1; 208/208 R, 213, 216 R, 217, 243, 244, 295
See application file for complete search history.

(56) References Cited

U.S. PATENT DOCUMENTS 4,153,674 A * 5/1979 Verloop et al. ............... 423/575

(Continued)

FOREIGN PATENT DOCUMENTS

EP          0324526 A1      7/1989

(Continued)

*Primary Examiner*—Walter D Griffin
*Assistant Examiner*—Natasha Young
(74) *Attorney, Agent, or Firm*—Wenderoth, Lind & Ponack, L.L.P.

(57) ABSTRACT

A COS treatment apparatus for a gasified gas includes an $O_2$ removal catalyst and a COS conversion catalyst located on the downstream side of a gasified gas flow with respect to the $O_2$ removal catalyst. Also, a COS treatment apparatus includes a $TiO_2$ catalyst that carries $Cr_2O_3$ or NiO. Further, a COS treatment method includes a first step in which $O_2$ is removed by the reaction with $H_2S$ and CO, and a second step in which COS is converted to $H_2S$.

3 Claims, 3 Drawing Sheets

U.S. PATENT DOCUMENTS

| | | | |
|---|---|---|---|
| 4,287,170 A | * | 9/1981 | Erickson ................. 423/579 |
| 4,320,100 A | * | 3/1982 | Engelbrecht et al. ........ 423/219 |
| 4,399,112 A | * | 8/1983 | Voirin ................. 423/230 |
| 4,618,723 A | * | 10/1986 | Herrington et al. ........... 568/70 |
| 4,857,297 A | * | 8/1989 | Kettner et al. ........... 423/576.8 |
| 4,981,661 A | | 1/1991 | Borsboom et al. |
| 5,059,303 A | * | 10/1991 | Taylor et al. ................. 208/96 |
| 5,536,302 A | * | 7/1996 | Golden et al. ................. 95/138 |
| 5,660,807 A | | 8/1997 | Förg et al. |
| 5,993,763 A | * | 11/1999 | Kaizik et al. ................. 423/236 |
| 6,019,954 A | * | 2/2000 | Tang et al. ................. 423/437.2 |
| 6,099,819 A | * | 8/2000 | Srinivas et al. ........... 423/573.1 |
| 6,497,855 B1 | * | 12/2002 | Wachs ................. 423/648.1 |
| 2003/0027912 A1 | * | 2/2003 | Tung et al. ................. 524/430 |
| 2004/0247507 A1 | * | 12/2004 | Nedez et al. ................. 423/236 |

FOREIGN PATENT DOCUMENTS

| | | |
|---|---|---|
| FR | 2830466 | 4/2003 |
| JP | 57-63388 | 4/1982 |
| JP | 62-256709 | 11/1987 |
| JP | 11-104451 | 4/1999 |
| JP | 2000-248286 | 9/2000 |
| WO | WO 02/04389 A1 * | 1/2002 |
| WO | 03/031058 | 4/2003 |

* cited by examiner

APPARATUS FOR TREATING COS FOR GAS PRODUCED BY GASIFICATION AND METHOD FOR TREATING COS

TECHNICAL FIELD

The present invention relates to an apparatus for removing COS (carbonyl sulfide) from a gasified gas obtained from coal, heavy oil, and the like.

BACKGROUND ART

There has been a demand in recent years for effective utilization of low-grade fuel, such as coal and heavy oil, in view of the diversification that is seeing not only high-grade fossil fuel but also low-grade fossil fuel being actively used. Also, in the field of thermal power generation, from a view point of increasing power generation efficiency, combined cycle power generation in which a gas turbine using a gas fuel and a steam turbine are both used and power generation in which hydrocarbon gas is introduced to a fuel cell have come into wide use. In such a situation, research and development have been carried out to utilize a gasified low-grade fuel for power generation.

Since low-grade fuel generally contains a large amount of sulfur compounds, if it is gasified and burned without being subjected to treatment, the sulfur compounds are exhausted as sulfur oxides into the air through a stack, which causes environmental degradation such as acid rain. Therefore, in ordinary thermal power generation, what is done in practice is to provide an exhaust gas desulfurizer on the downstream side of a boiler for removing the sulfur compounds, for example, as gypsum. However, in the combined cycle power generation, materials are markedly corroded because the temperature at the inlet of gas turbine is higher than the temperature of boiler in the ordinary thermal power generation. To solve this problem, it is necessary to protect the materials by removing various kinds of impurities including sulfur compounds on the upstream side, not on the downstream side, of the gas turbine, which means that the aforementioned exhaust gas desulfurizer cannot be used. In fuel cell power generation as well, the securing of power generation efficiency and durability for the protection of materials is a must, and it is necessary to remove various kinds of impurities on the upstream side of the fuel cell.

As a method for removing the impurities, what is called a wet-type gas purifying process, in which water-soluble components are removed with a water scrubber and $H_2S$ (hydrogen sulfide) is removed with aqueous solution of amines, has been used in actual practice. However, the aqueous solution of amines is incapable of removing COS, although it is capable of removing $H_2S$. Therefore, hydrolysis expressed by Formula (1) is carried out using a COS conversion catalyst to accelerate a reaction in which COS is converted to a form of $H_2S$ that can be removed with the aqueous solution of amines.

$$COS+H_2O \rightarrow H_2S+CO_2 \quad (1)$$

As a COS conversion catalyst, a catalyst containing titania (refer to Japanese Patent No. 1463827, Japanese Patent Provisional Publication No. 11-80760(No. 80760/1999), etc.), a catalyst containing alumina, a group IV metal, and barium, and a catalyst containing an alkali metal, chromium oxide, and alumina are known (Japanese Patent Provisional Publication No. 2000-248286). However, these catalysts have a problem in that catalytic activity is decreased by unburned $O_2$ that is present in minute quantities (in the order of ppm) in the gasified gas. Also, since nitrogen that is introduced from the outside to provide a seal also contains a minute quantity of $O_2$, the problem of decreased catalytic activity becomes more serious.

In order to prevent the decrease in activity of the COS conversion catalyst due to the $O_2$, a process in which a combustion catalyst is provided on the upstream side of the COS conversion catalyst has also been devised. However, this process has some problems in that the combustion catalyst is expensive because it generally carries a noble metal, the combustion catalyst is prone to be poisoned by $H_2S$ and thus cause a decrease in performance, and heat generation on the combustion catalyst gives great stress to the peripheral equipment.

SUMMARY OF THE INVENTION

An object of the present invention is to protect peripheral equipment by relieving heat generation stress and to protect a COS conversion catalyst from $O_2$.

The present invention is characterized in that by installing an $O_2$ removal catalyst for accelerating the reaction in Formula (2) on the upstream side of the COS conversion catalyst, $O_2$ is removed, and a decrease in performance of COS conversion catalyst is prevented.

$$2H_2S+2CO+O_2 \rightarrow +2COS+2H_2O \quad (2)$$

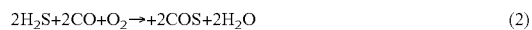

The inventors compared the merits of maintaining catalytic activity by removing $O_2$ with the demerits of increasing the load of catalyst by synthesizing COS. As a result, the inventors discovered that the former is greater, and thus found the significance of accelerating the reaction in Formula (2).

The present invention provides a COS treatment apparatus for a gasified gas containing $H_2S$, $H_2O$, $O_2$, and CO, characterized in that an $O_2$ removal catalyst and a COS conversion catalyst located on the downstream side of a gasified gas flow with respect to the $O_2$ removal catalyst are provided.

According to the COS treatment apparatus provided with the $O_2$ removal catalyst in accordance with the present invention, since a decrease in activity of COS conversion catalyst due to $O_2$ can be prevented, an adverse influence exerted by unburned $O_2$ that is not fixed depending on the operation state of a gasification furnace and $O_2$ in the air, which is intentionally introduced to provide a seal, can be avoided. Also, a combustion catalyst that is expensive and short in service life and causes thermal stress is not used to remove $O_2$, so that a reduction in cost and an increase in reliability can be achieved.

Also, the present invention provides a COS treatment method for a gasified gas containing $H_2S$, $H_2O$, $O_2$, and CO, characterized by including a first step in which $O_2$ is removed by the reaction with $H_2S$ and CO, and a second step in which COS is converted to $H_2S$.

DETAILED DESCRIPTION OF THE INVENTION

An embodiment of a COS treatment apparatus in accordance with the present invention will be described with reference to FIGS. 1 to 4.

Figure 1:
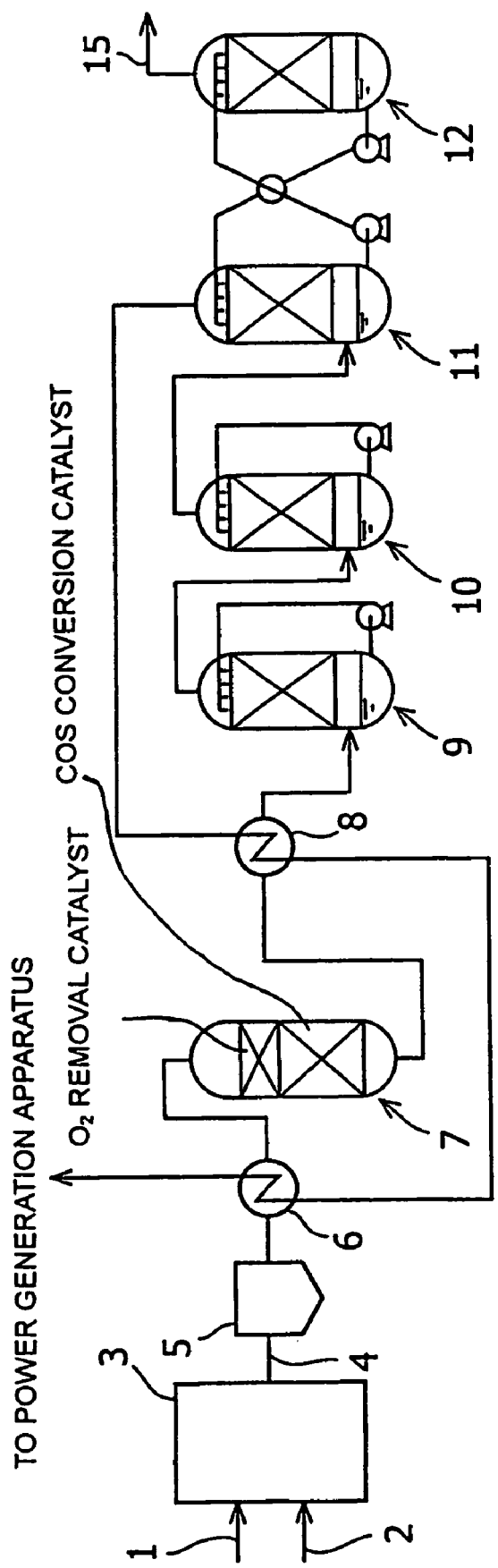
FIG. 1 is a diagram showing one example of a flow of a wet-type gas purifying system to which the present invention is suitably applied.

FIG. 1 is a diagram showing one example of a flow including a gasification furnace 3 and a wet-type gas purifying system to which the present invention is suitably applied. The gasification furnace 3 is a publicly known one, in which low-grade fuel 1, such as coal and heavy oil, and oxygen, air, or oxygen enriched air, which is a gasifying agent 2, are charged, and gasified gas 4 is taken out. From the taken-out gasified gas, dust is preferably removed by using a publicly known dust collector 5. A first heat exchanger 6 provided between the dust collector 5 and a COS treatment apparatus 7 gives heat that the gasified gas before purification has to the gasified gas after purification. The type of the heat exchanger is not subject to any special restriction, and a generally used multitubular heat exchanger is used. The COS treatment apparatus 7 converts COS, which cannot be absorbed by a $H_2S$ absorption tower 11, described later, to $H_2S$. In the conventional technique, the COS treatment apparatus 7 has been charged with only a COS conversion catalyst in a reactor. On the other hand, in the present invention, the COS treatment apparatus 7 is characterized by being charged with a combination of an $O_2$ removal catalyst and a COS conversion catalyst or a COS conversion catalyst that also has a function of $O_2$ removal. In FIG. 1, the $O_2$ removal catalyst is placed at an upper part of the COS treatment apparatus, and the COS conversion catalyst is placed at a lower part thereof, by which the gasified gas is introduced from the upper part, and the treated gas is taken out from the lower part.

The $O_2$ removal catalyst is preferably installed under a high-temperature condition as described later in examples. On the other hand, the COS conversion catalyst must be installed in the optimum service temperature region depending on the properties of gas to be treated in the service temperature range of 200 to 400° C., because at equilibrium of the COS conversion reaction shown in Formula (1), the reaction toward the left-hand side is predominant when the temperature is high. Therefore, a mode is possible in which the $O_2$ removal catalyst is installed, for example, just behind the dust collector 5 of a higher temperature without interposing a heat exchanger therebetween so as to be separated from the COS conversion catalyst. Since the performance of $O_2$ removal catalyst increases at high temperatures, the necessary catalyst charging amount can be decreased by installing the $O_2$ removal catalyst in a high-temperature atmosphere. At this time, the first heat exchanger 6 can be installed behind the $O_2$ removal catalyst. However, the number of pressure vessels for charging catalyst is increased by installing the $O_2$ removal catalyst separately from the COS catalyst, so that cost is studied according to the properties of gas to be treated, by which the optimum arrangement must be determined.

The arrangement of catalysts of one kind or two kinds in the present invention will be described later with reference to FIGS. 2 to 4.

Since the method for charging the catalyst is not subject to any special restriction, a publicly known method, for example, a method in which a granular or honeycomb-shaped catalyst is housed in a proper reactor can be used. Also, the $O_2$ removal catalyst is not subject to any special restriction as long as it acts to accelerate the chemical reaction in Formula (2). For example, a catalyst containing chromium oxide or nickel oxide, barium, and titania can be used, and in particular, a honeycomb-shaped $TiO_2$ catalyst carrying $CR_2O_3$ and barium is preferably used.

The COS conversion catalyst is not subject to any special restriction as long as it acts to accelerate the chemical reaction in Formula (1). For example, a catalyst containing alumia, a group IV metal, and barium with $Al_2O_3$ or $TiO_2$ being a carrier, a catalyst containing an alkali metal, chromium oxide, and alumina, or a catalyst containing barium and $TiO_2$ can be used. Among these, a honeycomb-shaped $TiO_2$ catalyst carrying barium is preferably used. The preferred amount of addition of $Cr_2O_3$ at the time when $TiO_2$ is used as a carrier is not smaller than 0.1 wt % and not larger than 6 wt %, further preferably not smaller than 3 wt % and not larger than 6 wt %. The preferred amount of addition of NiO at the time when $TiO_2$ is used as a carrier is not smaller than 0.1 wt % and not larger than 15 wt %, and is further preferably not smaller than 5 wt % and not larger than 10 wt %. The preferred amount of addition of BaO at the time when $TiO_2$ is used as a carrier is not smaller than 0.1 wt % and not larger than 10 wt %, and is further preferably not smaller than 3 wt % and not larger than 6 wt %.

A second heat exchanger 8 provided between the COS treatment apparatus 7 and a gas cooling tower 9 serves, like the first heat exchanger 6, to give heat that the gasified gas before purification has to the gasified gas after purification. The gasified gas after purification passes through the second heat exchanger 8 first and the first heat exchanger 6 next, by which a counterflow is formed with respect to the gasified gas before purification. Since a large average temperature difference can be secured as compared with the case of parallel flow, the heat exchangers can be designed so as to be small in size, which is advantageous in terms of economy.

The gasified gas before purification, which has passed through the second heat exchanger 8, goes into a water scrubber 10, where water-soluble impurities are removed from the gasified gas. Preferably, another water scrubber 9 is provided between the second heat exchanger 8 and the water scrubber 10 to raise the solubility of water-soluble impurities with respect to the circulating water of the water scrubber 10. As the water scrubber 9, a water scrubber having the same construction as that of the water scrubber 10 can be used. The circulating water in which impurities are dissolved is discharged to the outside of the system through a discharge line, not shown, and make-up water corresponding to the discharge amount is supplied through a make-up water line, not shown. As the water scrubber 9, 10, a publicly known water scrubber can be used.

The gasified gas having come out of the water scrubber 10 goes into the $H_2S$ absorption tower 11, where the gasified gas comes into gas-liquid contact with a fresh absorbing solution consisting of aqueous solution of amine compound. $H_2S$ in the gasified gas is absorbed in the aqueous solution of amine compound. The gasified gas is taken out as a purified gas suitable as a fuel for a power generation apparatus such as a gas turbine and fuel cell. The purified gas is heated by obtaining heat from the gasified gas before purification in the aforementioned second heat exchanger 8 and first heat exchanger 6, and therefore is utilized as a fuel having higher power generation efficiency. The absorbing solution having absorbed $H_2S$ is sent to an absorbing solution regeneration tower 12, where the absorbing solution is separated into fresh absorbing solution and high-concentration $H_2S$ 15 by heat given by a absorbing solution regeneration heat source 14. The fresh amine compound returns to the $H_2S$ absorption tower 11 to be reused. The high-concentration $H_2S$ 15 can be used as a raw material for elemental sulfur, gypsum, sulfuric acid, and the like, and does not act as an environmental degradation source. As the $H_2S$ absorption tower 11, absorbing solution regeneration tower 12, and absorbing solution, publicly known ones can be used. Also, as the apparatus and method for manufacturing a valuable substance such as elemental sulfur, gypsum, sulfuric acid, and the like, publicly known ones can be used.

Figure 2:
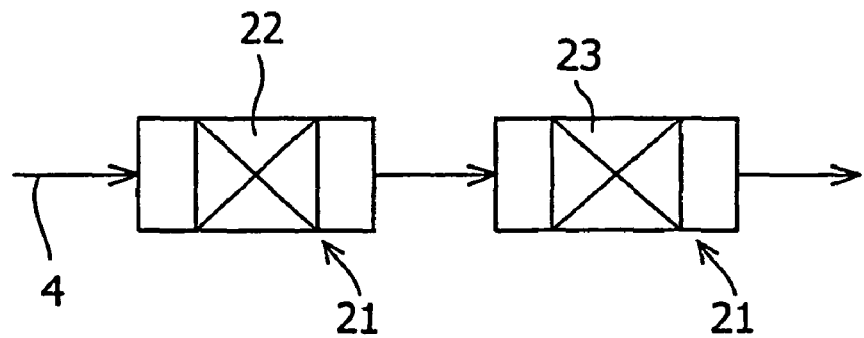
FIG. 2 is a view showing an example of arrangement of an $O_2$ removal catalyst and a COS conversion catalyst in examples 1 and 2 of the present invention, wherein both of the catalysts are arranged in individual reactors.
Figure 3:
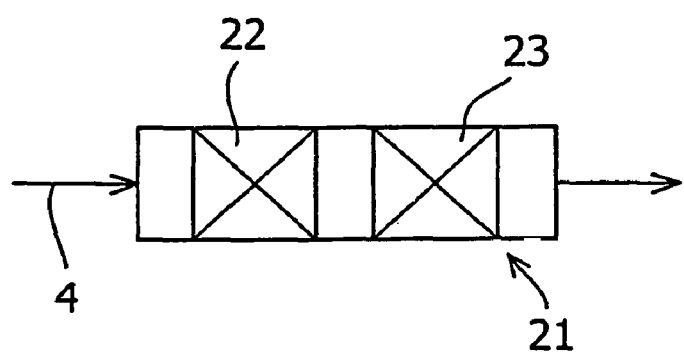
FIG. 3 is a view showing an example of arrangement of an $O_2$ removal catalyst and a COS conversion catalyst in examples 1 and 2 of the present invention, wherein both of the catalysts are arranged in a single reactor.
Figure 4:
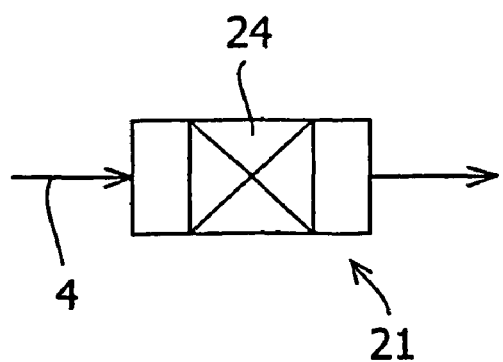
FIG. 4 is a view showing an example in which a COS conversion catalyst, which is also used as an $O_2$ removal catalyst, in example 3 of the present invention is arranged in a reactor.
Figure 5:
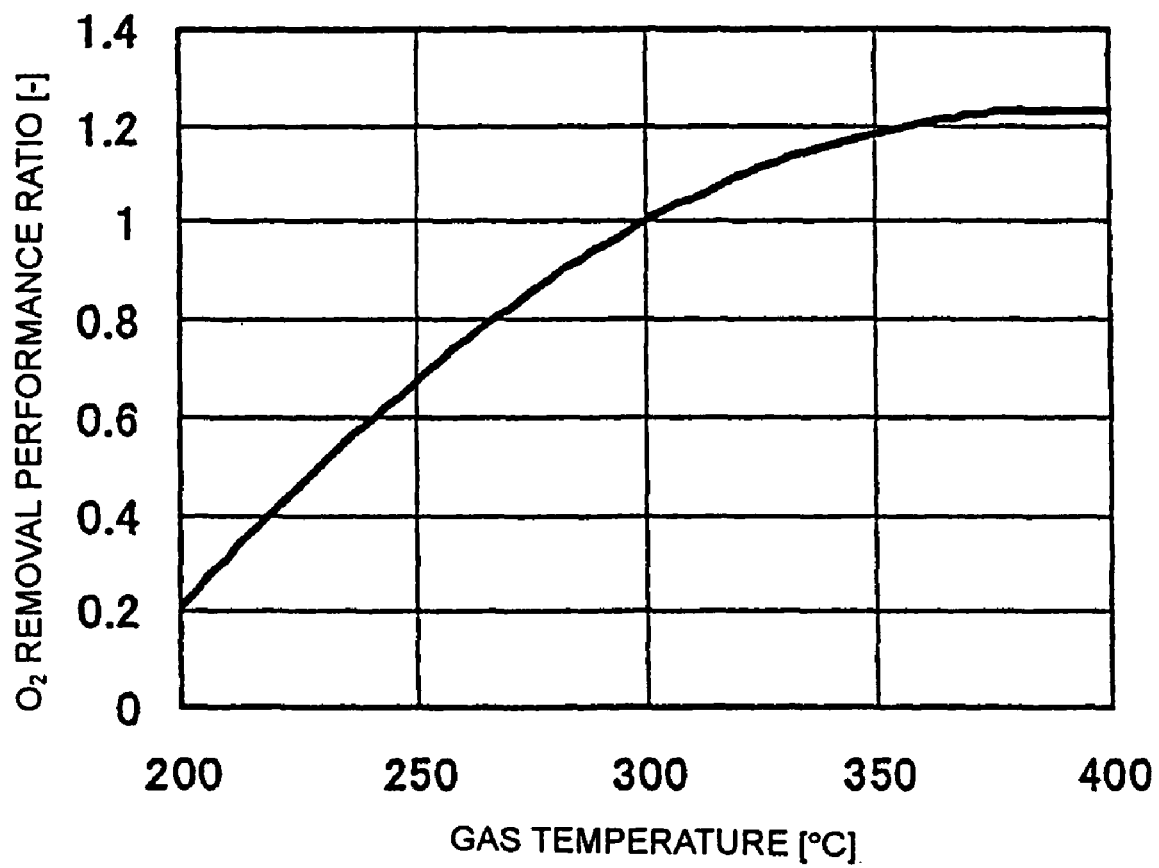
FIG. 5 is a graph showing a result of comparison of $O_2$ removal performance at the time when a gas temperature is changed in example 4 of the present invention.

FIGS. 2 to 4 are views in which attention is paid to the COS treatment apparatus 7 in accordance with the present invention. FIG. 2 shows an example in which a first reactor 21 provided with an $O_2$ removal catalyst 22 therein and a second reactor 21' provided with a COS conversion catalyst 23 therein, which is disposed on the downstream side of the first reactor 21, are combined. FIG. 3 shows an example in which a single reactor 21 is provided therein with the $O_2$ removal catalyst 22 on the upstream side of the gasified gas flow and the COS conversion catalyst 23 on the downstream side thereof. FIG. 4 shows an example in which a reactor 21 is provided therein with a combinedly used COS conversion catalyst 24 that also has a function of $O_2$ removal. As the combinedly used COS conversion catalyst, a catalyst containing $Cr_2O_3$, barium, and $TiO_2$ can be used. In particular, a $TiO_2$ catalyst carrying $Cr_2O_3$ and BaO is preferable because it is a catalyst which accelerates both reactions of $O_2$ removal and COS conversion. FIG. 5 shows a result of comparison of $O_2$ removal performance at the time when the gas temperature is changed.

EXAMPLES

COS conversion rates at the time when COS of 307 ppm was charged were compared by unifying the sum of $O_2$ removal catalyst and COS conversion catalyst into SV=4528 [1/h]. As the result, the data shown in examples 1 to 3 in Table 1 were obtained. SV is a space velocity, and its unit is the inverse number of time. Also, the conditions under which the $O_2$ removal performance of $O_2$ removal catalyst was compared by changing the gas temperature are shown in example 4 in Table 1.

Example 1

$TiO_2$ carrying $Cr_2O_3$ (in Table 1, described as $Cr/TiO_2$) was used as the $O_2$ removal catalyst, and $TiO_2$ carrying BaO (in Table 1, described as $Ba/TiO_2$) was used as the COS conversion catalyst on the downstream side of the $O_2$ removal catalyst. As a result, the COS concentration on the COS conversion catalyst outlet side was 12 ppm, and the COS conversion rate was 0.961.

Example 2

$TiO_2$ carrying NiO (in Table 1, described as $Ni/TiO_2$) was used as the $O_2$ removal catalyst, and $TiO_2$ carrying BaO was used as the COS conversion catalyst on the downstream side of the $O_2$ removal catalyst. As the result, the COS concentration on the COS conversion catalyst outlet side was 14 ppm, and the COS conversion rate was 0.954.

Example 3

$TiO_2$ carrying $Cr_2O_3$ and BaO was used as the combinedly used COS conversion catalyst that has both functions of $O_2$ removal catalyst and COS conversion catalyst. As the result, the COS concentration on the COS conversion catalyst outlet side was 15 ppm, and the COS conversion rate was 0.951.

Comparative Example

The $O_2$ removal catalyst was not used, and $TiO_2$ carrying BaO was used as the COS conversion catalyst. As the result, the COS concentration on the COS conversion catalyst outlet side was 110 ppm, and the COS conversion rate was 0.642.

Example 4

An experiment was performed to compare the $O_2$ removal performance of the $O_2$ removal catalyst by changing the gas temperature. As the result, it was found that the performance increases with increasing temperature as shown in FIG. 5.

TABLE 1

| | | Results of experiment | | | | |
| --- | --- | --- | --- | --- | --- | --- |
| Item | Unit | Example 1 | Example 2 | Example 3 | Comparative example | Example 4 |
| Inlet gas condition | | | | | | |
| $H_2$ | Vol- | | | 12.6 | | |
| $H_2O$ | Vol- | | | 3.1 | | |
| CO | Vol- | | | 28.4 | | |
| $CO_2$ | Vol- | | | 4.2 | | |
| $N_2$ | — | | | Balance | | |
| $H_2S$ | Ppm- | | | 567 | | |
| COS | Ppm- | | | 307 | | |
| $O_2$ | Ppm- | | | 145 | | 240 |
| Temperature | °C. | | | 300 | | 200~400 |
| Pressure | Mpa | | | 2.29 | | |
| Catalyst condition | | | | | | |
| $O_2$ removal catalyst  Kind | — | 5.5 wt % Cr2O3/ TiO$_2$ | 10 wt % NiO/TiO$_2$ | 5.5 wt % Cr2O3/ BaOTiO$_2$ | None | 5.5 wt % Cr2O3/ TiO$_2$ |
| SV | 1/h | 11320 | | 4528 | — | 30000 |

TABLE 1-continued

Results of experiment

| Item | | Unit | Example 1 | Example 2 | Example 3 | Comparative example | Example 4 |
|---|---|---|---|---|---|---|---|
| COS conversion catalyst | Kind | — | 4 wt % BaO/TiO$_2$ | | ($O_2$ removal catalyst was combinedly used) | 4 wt % BaO/TiO$_2$ | None |
| | SV | 1/h | 7547 | | | 4528 | — |
| Sum of catalysts | SV | 1/h | | | 4528 | | 30000 |
| Outlet gas component | | | | | | | |
| H$_2$S | | ppm-v | 862 | 860 | 859 | 764 | — |
| COS | | ppm-v | 12 | 14 | 15 | 110 | — |
| Performance | | | | | | | |
| COS conversion rate* | | — | 0.961 | 0.954 | 0.951 | 0.642 | — |

Vol % is percentage by volume, and ppm-v is parts per million by volume.
*COS conversion rate = (inlet COS concentration-outlet COS concentration) /inlet COS concentration

INDUSTRIAL APPLICABILITY

The COS treatment apparatus and COS treatment method for a gasified gas in accordance with the present invention can suitably be applied to power generation having high power generation efficiency in the field of thermal power generation such as combined cycle power generation in which a low-grade fossil fuel such as coal and heavy oil is gasified, and a gas turbine using a gas fuel and a steam turbine are both used, or power generation in which hydrocarbon gas is introduced to a fuel cell.

The invention claimed is:

1. A COS treatment method for a gasified gas containing COS, H$_2$S, H$_2$O, O$_2$, and CO, the method comprising:
   increasing an initial concentration of COS in the gas and decreasing concentrations of H$_2$S, CO and O$_2$ in the gas by using an O$_2$ removal catalyst consisting of TiO$_2$ and Cr$_2$O$_3$ or consisting of TiO$_2$ and NiO at a gas temperature of at least 300° C. to accelerate the following reaction:

$2H_2S+2CO+O_2 \rightarrow 2COS+2H_2O$; and after the increasing of the initial concentration of COS in the gas and the decreasing of the concentrations of H$_2$S, CO and O$_2$ in the gas, decreasing the increased concentration of COS in the gas to a concentration lower than the initial concentration of COS in the gas by converting COS contained in the gas to H$_2$S by using a COS conversion catalyst.

2. The COS treatment method according to claim 1, wherein said increasing of the initial concentration of COS in the gas and decreasing of the concentrations of H$_2$S, CO and O$_2$ in the gas is performed at a higher temperature with respect to said decreasing of the increased concentration of COS in the gas.

3. A COS treatment method for a gasified gas containing COS, H$_2$S, H$_2$O, O$_2$, and CO, the method comprising:
   removing O$_2$ from the gas by using a TiO$_2$ catalyst carrying Cr$_2$O$_3$ and BaO to accelerate the following reaction:

$2H_2S+2CO+O_2 \rightarrow 2COS+2H_2O$; and simultaneously converting COS to H$_2$S by using the TiO$_2$ catalyst carrying Cr$_2$O$_3$ and BaO.

* * * * *